(12) United States Patent
Pulapura et al.

(10) Patent No.: US 10,767,006 B2
(45) Date of Patent: Sep. 8, 2020

(54) HYDROGENATION OF TYROSINE DERIVED POLYARYLATES

(71) Applicant: TYRX, Inc., Monmouth Junction, NJ (US)

(72) Inventors: Satish Pulapura, Bridgewater, NJ (US); Dan Thanh Le, Franklin Park, NJ (US); Xiangji Chen, Plymouth, MN (US); Suping Lyu, Maple Grove, MN (US); Fatima Buevich, Highland Park, NJ (US)

(73) Assignee: MEDTRONIC, INC., Minneapolis, MN (US)

( * ) Notice: Subject to any disclaimer, the term of this patent is extended or adjusted under 35 U.S.C. 154(b) by 135 days.

(21) Appl. No.: 15/972,855

(22) Filed: May 7, 2018

(65) Prior Publication Data

US 2018/0355104 A1 Dec. 13, 2018

Related U.S. Application Data

(60) Provisional application No. 62/516,298, filed on Jun. 7, 2017.

(51) Int. Cl.
*C08G 63/40* (2006.01)
*C08G 63/91* (2006.01)
*C08G 63/685* (2006.01)

(52) U.S. Cl.
CPC ......... *C08G 63/91* (2013.01); *C08G 63/6856* (2013.01); *C08G 63/916* (2013.01)

(58) Field of Classification Search
None
See application file for complete search history.

(56) References Cited

U.S. PATENT DOCUMENTS

| | | | | | |
|---|---|---|---|---|---|
| 3,502,635 | A * | 3/1970 | Halasa | ............. | C08F 36/04 526/160 |
| 5,317,077 | A * | 5/1994 | Kohn | ............. | A61K 9/204 528/176 |
| 5,576,407 | A * | 11/1996 | Kroner | ............. | C08F 216/14 526/307.5 |
| 6,120,491 | A * | 9/2000 | Kohn | ............. | C08G 69/44 528/176 |
| 7,408,012 | B1 * | 8/2008 | Kneafsey | ............. | C08F 30/08 428/355 R |
| 8,629,233 | B2 * | 1/2014 | Schwartz | ............. | A61L 31/041 528/203 |
| 9,822,195 | B2 * | 11/2017 | Ruehmer | ............. | C08K 3/36 |
| 2017/0212054 | A1 * | 7/2017 | Reed | ............. | G01N 15/06 |
| 2018/0354970 | A1 * | 12/2018 | Stumpf | ............. | C07D 498/14 |
| 2019/0128812 | A1 * | 5/2019 | Reed | ............. | C08F 20/56 |

FOREIGN PATENT DOCUMENTS

| | | |
|---|---|---|
| EP | 1908490 A1 | 4/2008 |
| WO | 2010006249 A1 | 1/2010 |
| WO | 2010141475 A1 | 12/2010 |

OTHER PUBLICATIONS

Fiordeliso, J. et al, Design, synthesis, and preliminary characterization of tyrosine containing polyarylates:New biomaterials for medical applications, Journal of Biomaterials Science, vol. 5, No. 6, Jan. 1, 1994 pp. 497-510.

PCT/US2018/031581 International Search Report, Written Opinion of the International Searching Authority, EPO, Rijswijk, NL, dated Aug. 24, 2018.

International Search Report and Written Opinion of the International Searching Authority, European Patent Office, PCT/US2018/031581, dated Dec. 19, 2019.

\* cited by examiner

*Primary Examiner* — Tae H Yoon
(74) *Attorney, Agent, or Firm* — Sorell, Lenna & Schmidt, LLP

(57) ABSTRACT

A method for hydrogenating tyrosine derived polyarylates includes dissolving a second polyarylate with DMF in a flask to produce a first solution. A catalyst is added to the first solution to produce a polymer solution. The polymer solution is filtered through a Celite bed to produce a filtrate. The filtrate is added to water and stirred to precipitate the polyarylate.

21 Claims, No Drawings

HYDROGENATION OF TYROSINE DERIVED POLYARYLATES

TECHNICAL FIELD

The present disclosure generally relates to methods by which tyrosine derived polyarylates are hydrogenated with significantly improved yield and purity.

BACKGROUND

Conventional methods to hydrogenate tyrosine derived polyarylates are often very time consuming and often result in low yield and/or purity. This disclosure describes an improvement over these prior art technologies.

SUMMARY

In one embodiment, in accordance with the principles of the present disclosure, a method is provided for hydrogenating a polyarylate having the formula (wherein X can be any number between 0 and 100):

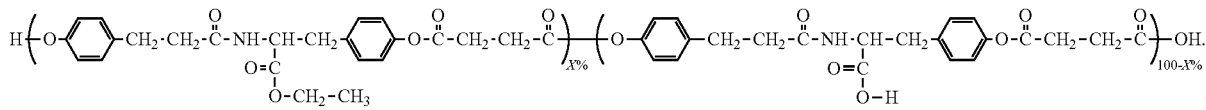

The method includes dissolving a second polyarylate having the formula (wherein X can be any number between 0 and 100):

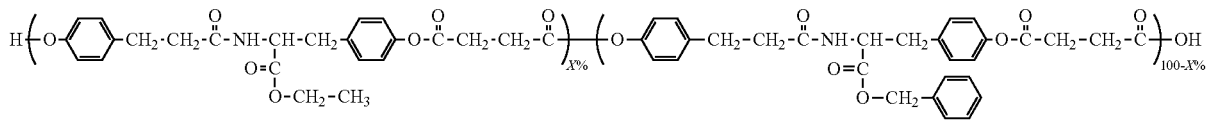

with dimethylformamide (DMF) in a flask to produce a first solution and starting a flow of hydrogen. A catalyst is added to the first solution to produce a polymer solution. The polymer solution is filtered through a Celite bed to produce a filtrate. The filtrate is added to water and stirred to precipitate the polyarylate. In some embodiments, the polyarylate is hydrogenated using the reagents shown in the tables below.

| Reagents | Amount (moles) |
| --- | --- |
| Poly (DTE co 27.5% DT Benzyl Succinate) | 1015 g |
| 5% Pd/BaSO4 | 351.5 g |
| N,N-Dimethylformamide | 20263 ml |

| Reagents | Amount (moles) |
| --- | --- |
| Poly (DTE co 27.5% DT Benzyl Succinate) | 14 g |
| 5% Pd/BaSO4 | 6.3 g |
| N,N-Dimethylformamide | 280 ml |

DETAILED DESCRIPTION

For the purposes of this specification and appended claims, unless otherwise indicated, all numbers expressing quantities of ingredients, percentages or proportions of materials, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding the numerical ranges and parameters set forth herein, the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

Reference will now be made in detail to certain embodiments of the invention. While the invention will be described in conjunction with the embodiments discussed herein, it will be understood that the embodiments discussed herein are not intended to limit the invention to those embodiments. On the contrary, the invention is intended to cover all alternatives, modifications, and equivalents that may be included within the invention as defined by the appended claims.

In one embodiment, in accordance with the principles of the present disclosure, a method is provided for hydrogenating a polyarylate having the formula:

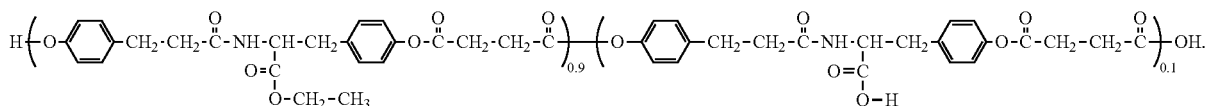

The method includes dissolving a second polyarylate having the formula:

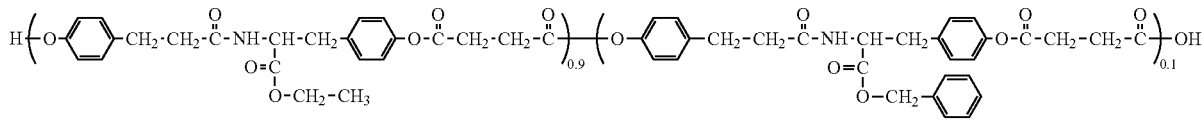

with DMF in a flask to produce a first solution and starting the flow of hydrogen. A catalyst is added to the first solution to produce a polymer solution. The polymer solution is filtered through a Celite bed to produce a filtrate. The filtrate is added to water and stirred to precipitate the polyarylate.

In some embodiments, the method further comprises stirring the polyarylate and the DMF to produce the first solution. In some embodiments, one or more absorbent, such as, for example, activated carbon, activated alumina or basic resins are added to absorb impurities in the first solution prior to adding the catalyst. In some embodiments, the absorbents are filtered out of the first solution prior to adding the catalyst. In some embodiments, the DMF is dried with resins or treated with one or more absorbent, which are then removed by filtration, prior to adding the polyarylate to make solution 1.

Increasing the amount of the catalyst will speed up the reaction. As such, in some embodiments, the method uses about three times the amount of catalyst used in conventional methods. In some embodiments, the catalyst comprises palladium (Pd). In some embodiments, the catalyst comprises about 5% Pd/BaSO4.

It has been found that the hydrogenation reaction may stall because the catalyst is poisoned either chemically (e.g., due to the presence of sulfur compounds) or physically (e.g., by irreversible deposition of some material onto the catalyst that restricts access to the active catalyst sites). However, the hydrogenation reaction can be restarted by adding incremental amounts of the catalyst until the reaction goes to completion. As such, spent catalyst is filtered out of the polymer solution and the polymer solution is recharged with fresh catalyst.

In some embodiments, the catalyst is added to the first solution incrementally. This allows any inactivating agent present in the polymer solution to be used up before additional aliquots of the catalyst are added. In some embodiments, a first amount of the catalyst is added to the first solution to produce a first catalyst solution; a second amount of the catalyst is added to the first catalyst solution to produce a second catalyst solution; and a third amount of the catalyst is added to the second catalyst solution to produce a third catalyst solution. In some embodiments, the first amount is greater than the second amount and the second amount is greater than the third amount. In some embodiments, the first catalyst solution is stirred for about 5.5 hours before adding the second amount of the catalyst to the first catalyst solution; the second catalyst solution is stirred overnight before adding the third amount of the catalyst to the second catalyst solution; and the third catalyst solution is stirred for about 1.75 hours. It has been found that catalysts having smaller particle sizes increase the available surface area of catalyst sites to complete the hydrogenation reaction faster. In some embodiments, the catalyst has a small particle size. In some embodiments, the polymer solution comprises about 300 g to about 400 g of the polyarylate and about 80 g to about 100 g of the catalyst. In some embodiments, the catalyst has a small particle size. In some embodiments, the polymer solution comprises about 353.9 g of the polyarylate and about 89.2 g of the catalyst.

In some embodiments, the method further comprises starting the flow of hydrogen to the first solution and stopping the flow of hydrogen after the catalyst is added to the first solution. In some embodiments, the method further comprises filtering the polymer solution to remove the catalyst. In some embodiments, the polymer solution is filtered in two portions that are combined after being filtered. In some embodiments, the polymer solution is filtered using about 15 cm diameter filter paper. In some embodiments, a reagent, such as, for example, methanol (e.g., 20% methanol), protic solvents (e.g., acetic acid) and/or salt (NaCl) is added to increase the rate of filtration.

In some embodiments, the method further comprises preparing the Celite bed on a coarse sintered glass funnel using a slurry of Celite in DMF. In some embodiments, the Celite in DMF is allowed to settle by gravity and the Celite bed is packed by a vacuum. In some embodiments, the method further comprises discarding the filtrate. In some embodiments, the method further comprises washing the Celite bed with 3× about 250 ml to about 350 ml portions of DMF. In some embodiments, the method further comprises washing the Celite bed with 3×300 ml portions of DMF. In some embodiments, the polymer solution is filtered through the Celite bed. In some embodiments, the polymer solution is filtered for about 1.5 hours. In some embodiments, the polymer solution is pre-filtered with a coarse filter and is then centrifuged to remove a majority of the catalyst and increase the rate of filtration.

In some embodiments, the method further comprises cutting the polyarylate into chunks, precipitating the polyarylate and drying the polyarylate. In some embodiments, the polyarylate is dried under ambient conditions for about 48 hours. In some embodiments, the method further comprises adding a slurry of ice and water to the polyarylate and blending to produce a shredded polymer. In some embodiments, the method further comprises collecting the shredded polymer by filtration. In some embodiments, the method further comprises drying the shredded polymer under a stream of air for about 16 hours and under a vacuum for about 24 hours. In some embodiments, the method further comprises adding the dried shredded polymer to dichloromethane and stirring to produce a second polymer solution. In some embodiments, the method further comprises adding the second polymer solution to a slurry of 2-propanol and dry ice and blending to produce polymer shreds. In some embodiments, the method further comprises filtering the polymer shreds, adding the polymer shreds to isopropyl alcohol (2-propanol), blending the polymer shreds and the isopropyl alcohol and collecting the polymer shreds by filtration. In some embodiments, the method further comprises adding the polymer shreds to cold water, blending the polymer shreds and the cold water and collecting the polymer shreds by filtration. In some embodiments, the method further comprises drying the polymer shreds. In some embodiments, the polymer shreds are dried under a stream of air for about 24 hours and then under vacuum.

It has been found that the addition of solvents can help the hydrogenation reaction to proceed more efficiently than in methods wherein hydrogenation is carried out in pure DMF. As such, in some embodiments, the first solution includes a solvent. In some embodiments, the solvent comprises methanol and/or acetic acid. In some embodiments, the solvent comprises 20% of the first solution by volume.

Other catalysts can be used. These include Pd on Carbon, 5% Pd on Barium sulfate.

After the reaction is complete, the catalyst can be removed by centrifugation. On larger scale, filtration is carried out using Ertel Alsop Model-8S-6 Pharma Scale Laboratory Filter Press. It is sometimes advantageous to first centrifuge and then filter.

If the polymer solution that has be filtered is very viscous, then addition of methanol will make the filtration faster.

In some instances, the filtration becomes very slow. It is believed that this is caused by some physical crosslinking between the carboxylic acid groups. These crosslinks can be broken by addition of solvents and chemicals that can break these physical crosslinks. e.g. Methanol, trifluoracetic acid, inorganic salts.

In some embodiments, the method further comprises bubbling hydrogen into the reactor at atmospheric pressure to reduce Pd ions back to Pd metal and precipitate fine Pd particles. The hydrogen may be introduced via a tube that is just below the surface or via a sparger that is only partially submerged or fully submerged. It is envisioned that the sparger can be used such that the hydrogen is introduced as fine bubbles that have a higher probability of contacting the catalyst and saturating the active catalyst sites than larger bubbles. A blanketing flow of nitrogen passes over the top of the reaction to dilute the hydrogen as it is emitted into the atmosphere. In some embodiments, the method further comprises introducing nitrogen at the exit point of hydrogen, close to an exhaust of the reactor to avoid a reduction in the solubility of hydrogen. In some embodiments, a bubbling device is used to control the feeding rate and bubble size of the hydrogen to enhance a catalytic characteristic of the hydrogen. In some embodiments, the method further comprises removing the precipitated fine Pd particles by centrifugation or filtration. In some embodiments, the method further comprises adding insoluble high surface area particles to the polymer solution to aid the separation. In some embodiments, the insoluble high surface area particles comprise BaSO4, silica gel, ion exchange resins, or combinations thereof.

In some embodiments, the method further comprises monitoring the method using nuclear magnetic resonance. It has been found that the solution viscosity is strongly correlated to the progress of the reaction. The viscosity decreases with time. As such, in some embodiments, the method further comprises monitoring the method using a viscosity measurement. In some embodiments, the method further comprises adding more of the catalyst based on the viscosity measurement. In some embodiments, the viscosity measurement is obtained using an online viscometer. Monitoring the method using a viscosity measurement avoids using undue labor or time to isolate and dry the reaction product, which is necessary when monitoring the method using nuclear magnetic resonance, for example. In some embodiments, the method further comprises monitoring the method using infrared spectra.

Toluene is a side product of hydrogenation. 1 mole of toluene is released per mole of benzyl group. As such, in some embodiments, the method further comprises monitoring the method by measuring toluene. In some embodiments, the toluene is measured by gas chromatography or liquid chromatography.

It has been found that upon exposure to the atmosphere, catalysts such as Pd leach into the first solution. The dissolved catalyst cannot be removed by filtration and contaminates the product. As such, in some embodiments, the method further comprises adding a scavenger to absorb Pd from the catalyst that may have leached into the solution. In some embodiments, the scavenger is added before the polymer solution is filtered. In some embodiments, a filter is impregnated with the scavenger before the polymer solution is filtered through the filter. In some embodiments, the scavenger comprises a heavy metal. In some embodiments, the scavenger comprises Quadrapure.

It has been found that simple inorganic iodides react with Pd and give a purple color presumably due to the presence of free carboxylates after benzyl groups have been removed. The reaction is quantitative, very sensitive and can be carried out in minutes. As such, in some embodiments, the method further comprises monitoring the leaching of Pd into the DMF solution using an iodine compound to monitor the amount of dissolved catalyst. In some embodiments, the iodine compound is an inorganic iodide. In some embodiments, the inorganic iodide is KI and/or NaI.

In some embodiments, the method further comprises adding a metal scavenger to remove the catalyst after the catalyst dissolves. In some embodiments, the metal scavenger comprises polystyrene beads.

Example 1

A polyarylate was hydrogenated, the polyarylate having the formula:

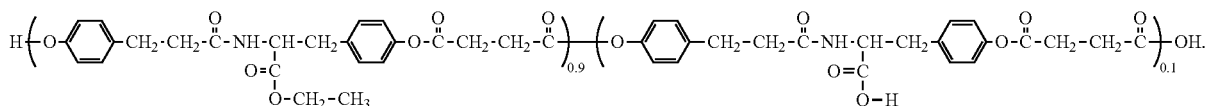

was hydrogenated using the materials in Table 1.

TABLE 1

| Reagents | Amount (moles) |
| --- | --- |
| Poly (DTE co 10% DT Benzyl Succinate) | 353.9 g |
| 5% Pd/BaSO4 | 89.2 g |
| N,N-Dimethylformamide | 8 liters |
| Dichloromethane | |
| 2-Propanol | |
| Celite | 92 g |

Poly (DTE co 10% DT Benzyl Succinate) has the formula:

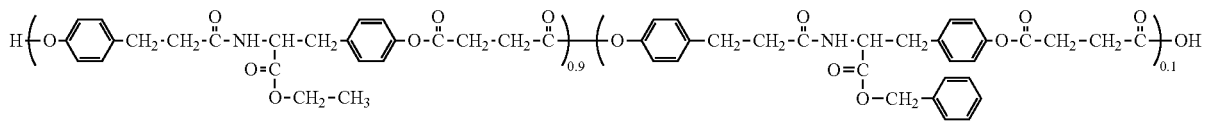

Poly (DTE co 10% DT Benzyl Succinate) and 8 liters of DMF were added to a 5 L 3-necked round-bottomed flask that was fitted with an overhead stirrer, thermometer and condenser. The contents of the flask were stirred for about 30 minutes until the polymer dissolves. A flow of hydrogen was started. The flow of hydrogen was controlled to see a rapid but discrete bubble stream. 79.4 g of the catalyst (5% Pd/BasO4) was added and stirred for 5.5 hours. An additional 8.9 g catalyst was added and stirred overnight. An additional 0.9 g catalyst was added and stirred for 1 h and 45 minutes. The flow of hydrogen was stopped. Stirring was stopped. The reaction was vacuum filtered in two portion using 15 cm diameter VWR 410 filter paper. The two portions were then combined. A Celite bed was prepared on a 3 L coarse sintered glass funnel using a slurry of 92 g Celite in 300 ml DMF. The Celite was allowed to settle by gravity and then the bed was packed by pulling vacuum. The filtrate was discarded. A VWR 410 filter paper was placed over the Celite bed and the bed was washed with 3×300 ml portions of DMF. The filtrate was discarded. The polymer solution was filtered through the Celite bed to obtain a clear light yellow filtrate. The total time of filtration was 1.5 h. The filtrate was added to 44 L of water with stirring. The polymer was precipitated as a large cheese like mass on the stirrer shaft. The mass was removed manually, cut into smaller chunks with shears, precipitated and dried under ambient conditions for 48 h. The precipitated polymer was removed periodically. About 2.5 L of slurry of ice/water was added to a 4 L stainless steel blender jar. The precipitated polymer was transferred into a 4 L blender jar containing 2.5 L slurry of ice in water (mostly water) and was blended at high speed for 2 minutes. The shredded polymer was collected by filtration and dried under a stream of air for 16 h and then under vacuum for 24 h. 357 g of the dried polymer was added to a 4 L Erlenmeyer Flask with 1750 ml of dichloromethane and stirred for 30 minutes to get complete dissolution. 500 ml of the polymer solution was added into a 4 L Waring blender containing a slurry of 2000 ml of 2-propanol and dry ice at high speed. This was repeated with the remaining polymer solution. The polymer shreds were collected by filtration and transferred to a 4 L blender jar containing 2000 ml IPA. The polymer shreds were blended at high speed for 2 minutes. The polymer shreds were collected by filtration and transferred to a 4 L blender jar containing 2000 ml cold water. The polymer shreds were blended at high speed for 2 minutes. The polymer shreds were collected by filtration and transferred to a 4 L blender jar containing 2000 ml cold water. The polymer shreds were blended at high speed for 2 minutes. The polymer shreds were collected by filtration and dried under stream of air for 24 hours and then under vacuum to reduce volatiles. This yielded about 300 g (90%) of the hydrogenated polyarylate. The specifications of the hydrogenated polyarylate are shown in Table 2.

TABLE 2

| QC-Test | Specification |
| --- | --- |
| Appearance | White solid |
| MW | 30-40 Kdalton (relative to polystyrene in THF) |
| $^1$H NMR | Equivalent to standard, complete absence of benzylic proton |
| Residual Pd | Less than 10 ppm |
| Residual volatilities | Less than 1% |
| Tg | 87 to 89° C. |

The DMF used in Example 1 was treated by activating molecular sieves 3A by heating to 85° C. under vacuum <0.5 mm hg overnight. 200 g of activated molecular sieves and 50 g of Amberlyst—15 Strongly Acidic was added to 10 L of DMF and stirred for 5 minutes at 160 rpm. The flask was capped and kept overnight. The clear top portion was decanted for use in the hydrogenation reaction.

In some instances, the polymer shreds can be dried by applying pressure to the polymer particles to squeeze out the water. For example, the polymer shreds can be placed between sheets of highly absorbent material and pressed in a Carver Press.

When the polymer is dried in the vacuum, desiccant such as molecular sieves maybe placed in the oven along with the polymer to dry the polymer faster.

The benzyl polymer used as the precursor undergoes a rigorous cleaning procedure to remove unreacted materials, residual solvents, catalysts and side reaction products.

Unexpectedly, it has been found that the hydrogenation reaction described here is very robust and small amounts of these residual materials do not impact the reaction. And they are effectively removed in the filtration, precipitation and washing steps.

Further, the reaction can be run more dilute (i.e. Adding more DMF per unit weight of polymer). This is particularly useful when the MW of precursor polymer is very high or if the reaction vessel is too large and there is not enough material to either stir efficiently or for the bubbler be submerged. The reaction can also be run at higher polymer concentration (i.e. Adding less DMF per unit weight of polymer). This is useful when the precursor polymer weight is lower or if the batch yield had to be increased.

When the batch is large and the filtration takes a long time (days), the filtered solution can be collected and intermittently stored in the freezer until all the polymer has been filtered. Similarly, if the precipitation steps take a long time, it would be preferred to store the bulk in the freezer and take out portions as needed.

It may be advantageous to store the shreds in the cold till the process is complete. Alternately, the reaction mixture can be processed in batches. The bulk of the filtrate is stored in the freezer. One portion is taken out, and processed until ready to dry. Then these shreds are stored in the cold and another portion worked up and the shreds stored in the cold. This is continued until all the reaction has been processed. Then all the sub lots are combined, mixed well to ensure homogeneity and then dried.

The shreds may be dried using a freeze dryer rather than a vacuum oven.

The reaction is scalable. For example, this can be done is with 20 L of reaction solvent.

It is found that the reaction is very insensitive to the rate of hydrogen introduction. On a 100 ml reaction scale, the rate of hydrogen flow could be reduced 10-fold (from 10 to 1).

To preserve the MW of the isolated polymer after drying, it is preferred to seal the polymer under nitrogen in foil bags, preferably with a desiccant such as molecular sieves.

Sometimes it is desirable to have polymers of consistent molecular weight. One way to ensure this is to have starting precursor benzyl polymer of the same molecular weight always. This can be accomplished by blending one or more batches of benzyl polymer of different molecular weights. This can be done at the start of the reaction by adding benzyl polymer of different molecular weights in the ratio that gives the target MW, adding DMF to dissolve the polymer and then proceeding as described above.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for synthesizing a polyarylate having the formula:

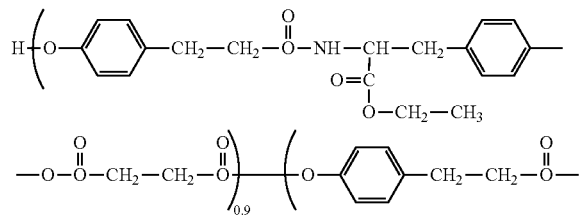

-continued

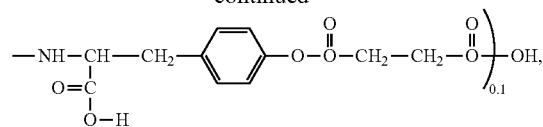

the method comprising:
dissolving a second polyarylate having the formula:

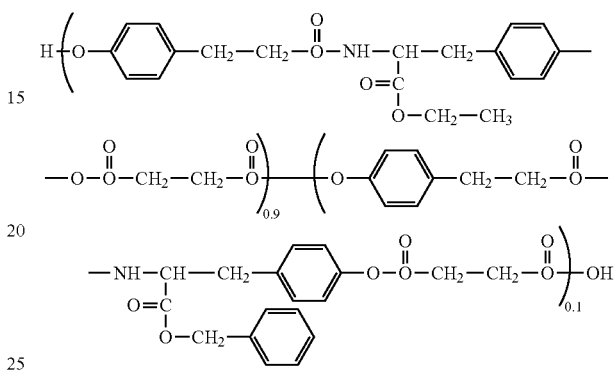

with DMF in a flask to produce a first solution;
starting a flow of nitrogen;
adding a catalyst to the first solution to produce a polymer solution;
starting a flow of hydrogen;
filtering the polymer solution through a filtration agent to produce a filtrate; and
adding the filtrate to water and stirring to precipitate the polyarylate,
wherein a first amount of the catalyst is added to the first solution to produce a first catalyst suspension,
wherein a second amount of the catalyst is added to the first catalyst suspension to produce a second catalyst suspension, and
wherein a third amount of the catalyst is added to the second catalyst suspension to produce a third catalyst suspension.

2. A method as recited in claim 1, wherein the first amount is greater than the second amount and the second amount is greater than the third amount.

3. A method as recited in claim 1, wherein:
the first catalyst suspension is stirred for about 5.5 hours before adding the second amount of the catalyst to the first catalyst suspension;
the second catalyst suspension is stirred overnight before adding the third amount of the catalyst to the second catalyst suspension; and
the third catalyst solution is in suspension for about 1.75 hours.

4. A method as recited in claim 1, further comprising drying the polymer shreds under a stream of air for about 24 hours and then under vacuum.

5. A method as recited in claim 1, wherein the first solution includes DMF and a solvent.

6. A method as recited in claim 5, wherein the solvent comprises methanol or acetic acid.

7. A method as recited in claim 5, wherein the solvent comprises 20% of the first solution by volume.

8. A method as recited in claim 1, further comprising monitoring the method using a viscosity measurement.

9. A method as recited in claim 8, further comprising adding more of the catalyst based on the viscosity measurement.

10. A method as recited in claim 8, wherein the viscosity measurement is obtained using an online viscometer.

11. A method as recited in claim 1, further comprising monitoring the method using infrared spectra.

12. A method as recited in claim 1, further comprising monitoring the method by measuring toluene.

13. A method as recited in claim 1, further adding a scavenger to remove leached catalyst.

14. A method as recited in claim 13, wherein the scavenger is added before the polymer solution is filtered.

15. A method as recited in claim 13, wherein the scavenger comprises a metal scavenger.

16. A method as recited in claim 1, further adding insoluble high surface area particles to the polymer solution produced by adding the catalyst to the first solution.

17. A method as recited in claim 16, wherein the insoluble high surface area particles comprise $BaSO_4$, silica gel, ion exchange resins, or combinations thereof.

18. A method as recited in claim 1, further comprising monitoring the method using an iodine compound to monitor the amount of dissolved catalyst, wherein the iodine compound is KI or NaI.

19. A method for synthesizing a polyarylate having the formula:

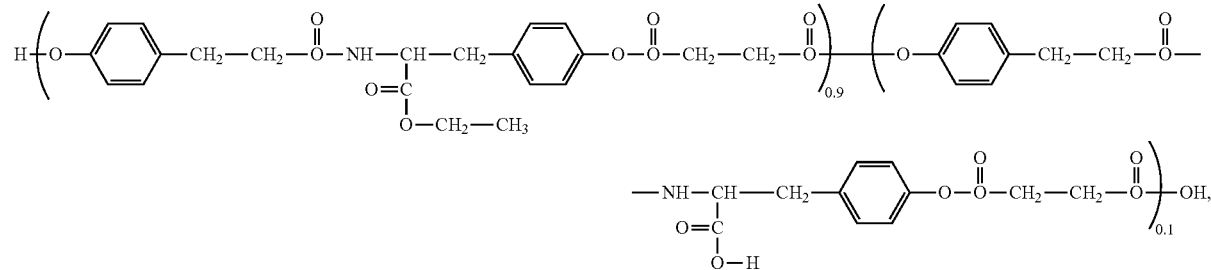

the method comprising:
dissolving a second polyarylate having the formula:

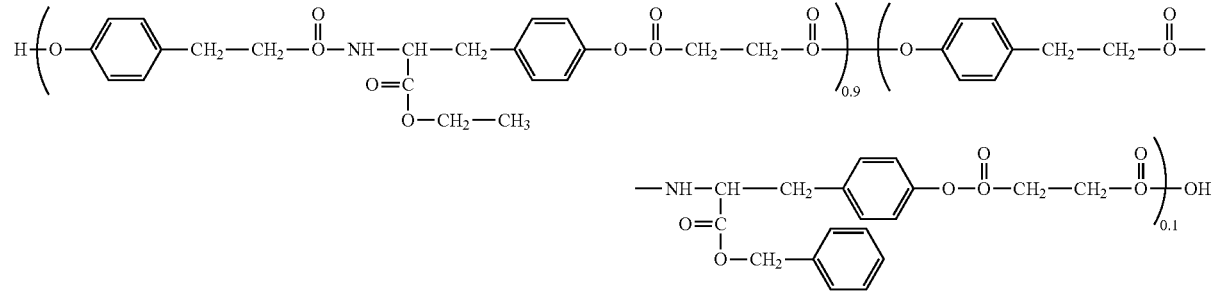

with DMF in a flask to produce a first solution, the first solution comprising DMF and a solvent, the solvent comprising methanol or acetic acid;
starting a flow of nitrogen;
adding a catalyst to the first solution to produce a polymer solution;
starting a flow of hydrogen;
filtering the polymer solution through a filtration agent to produce a filtrate; and
adding the filtrate to water and stirring to precipitate the polyarylate.

20. A method for synthesizing a polyarylate having the formula:

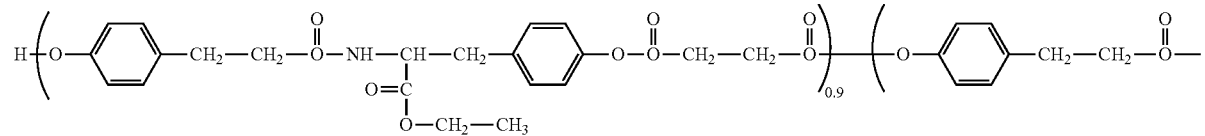

-continued

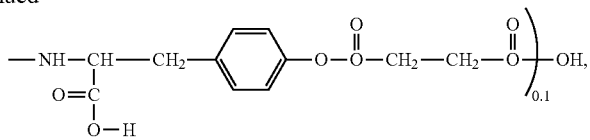

the method comprising:
dissolving a second polyarylate having the formula:

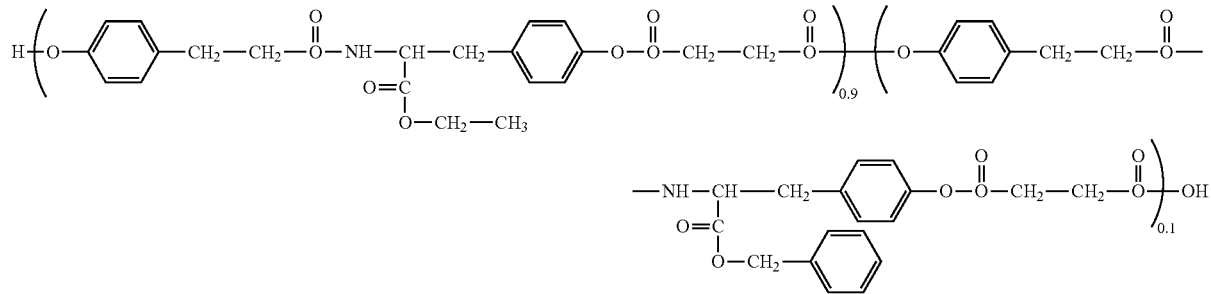

with DMF in a flask to produce a first solution;
starting a flow of nitrogen;
adding a catalyst to the first solution to produce a polymer solution;
adding insoluble high surface area particles to the polymer solution produced by adding the catalyst to the first solution;
starting a flow of hydrogen;
filtering the polymer solution through a filtration agent to produce a filtrate; and
adding the filtrate to water and stirring to precipitate the polyarylate.

21. A method as recited in claim 20, wherein the insoluble high surface area particles comprise BaSO4, silica gel, ion exchange resins, or combinations thereof.

* * * * *